May 1, 1934.  R. J. NORTON  1,957,051
BRAKE TEMPERATURE INDICATOR
Filed Sept. 24, 1930
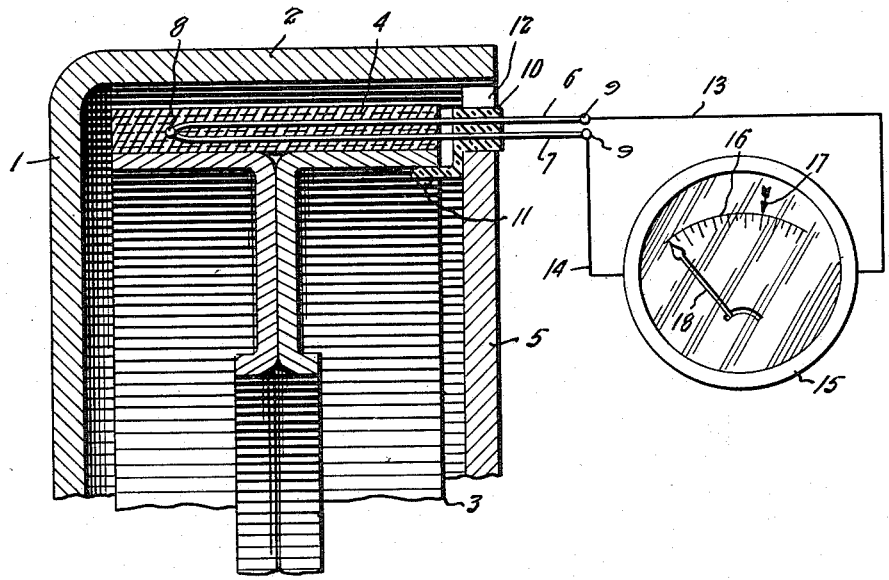
Inventor
RAYMOND J. NORTON
Semmes & Semmes
By att'd M. W. McConkey
Attorney Patented May 1, 1934

1,957,051

UNITED STATES PATENT OFFICE 1,957,051

BRAKE TEMPERATURE INDICATOR

Raymond J. Norton, Washington, D. C., assignor to Bendix Brake Company, South Bend, Ind., a corporation of Illinois Application September 24, 1930, Serial No. 484,211

1 Claim. (Cl. 73—32)

This invention relates to brake indicators. The usual type of brake now employed on automotive vehicles comprises essentially a rotating drum and cooperating non-rotating shoes. Some few types of brakes employ an external strap.

Due to the improvements in modern braking and particularly to the development of the servo type of brake automotive vehicles of the present day, despite their development of high speed, may be arrested within a very short distance. In retarding the speed of a car the brake in effect acts as an energy absorption machine. The kinetic energy of a moving machine is absorbed in the brake mechanism and is largely transformed into heat. It has been found that during ordinary braking the temperatures developing in the braking mechanism may reach a very high degree of the order of a thousand degrees F. or more. Such high temperatures are disadvantageous. At these temperatures the drum may easily distort and readily scarify. In addition to this, and particularly with certain types of friction material carbonization of the friction material may result. This obviously is a disadvantage and is to be avoided.

It is highly desirable to provide an indicating mechanism, positioned at a readily visible point, to disclose to the operator of the car the thermal conditions of his brakes. Heretofore there has been no means provided for this purpose. In ordinary circumstances a driver does not know that the brakes are overheated until serious damage has been done. He learns of the condition of the brakes only by being made aware of excessive decomposition or carbonization by smelling the "burning" of the brake. The burning of a brake can well be avoided if only an approximate indication of the temperature of the brake could be had.

It is a major purpose of the present invention therefore to provide an indicator showing the thermal condition of the brakes on vehicles.

Another object is to provide an indicator, for showing the condition of the brakes, which is positioned at a readily visible point, as for example on the dash board.

Yet another object is to provide an indicator showing the thermal condition of the brake calibrated in temperatures and provided with indicia disclosing a dangerous thermal condition.

Yet another object is to provide a rugged electrical indicator for disclosing, continuously, the condition of friction facings of brakes.

With these and other equally important objects in view the invention comprises the provision of an indicator which is responsive, either immediately or subsequently, to temperature changes in the brake mechanism to disclose the thermal condition.

With the given concept in mind it will be appreciated that a relatively wide variety of indicator mechanisms may be employed. No attempt will be made to explain all of the possible modifications which may be utilized and which involve the principles herein disclosed. As a typical example one such modification will be described.

The single figure in the accompanying drawing is a diagrammatic representation of a brake mechanism with its associated pyrometer connections and indicator.

As shown in the drawing the useful objects of the invention may be subserved by associating with the brake a thermometric device which indicates, with reasonable accuracy, the temperature of the brake. For purposes of explanation there is shown a thermo electric pyrometer the thermal element of which is directly associated with the friction facing.

As shown in the drawing the invention may be associated with a brake mechanism comprising a drum having a head 1, and a braking flange 2. Within this drum are positioned one or more brake shoes 3. The shoe or shoes may be provided with a friction facing 4. As is known, such shoes may be anchored to a non-rotating part and expanded at their unanchored end by any suitable means. The brake mechanism may be sealed off from extraneous matter by the backing plate 5. The temperature developed during braking, which is due to the generated frictional heat, may be indicated with reasonable accuracy by employing a simple thermal couple. As shown in the drawing this may comprise the thermo elements 6 and 7, the hot junction 8 of which is positioned within the zone of generated heat and the cold junctions 9 of which are spaced from the zone of generated heat and preferably so positioned as to be cooled by generated air currents.

For the purpose of clearly explaining the invention the elements on the drawing have been reduced so as to illustrate only the major principles involved. The particular installations, as will be appreciated, may vary widely.

As shown in the figure, the thermo element may be incorporated directly in the friction facing. This manner of mounting eliminates the protecting tube and greatly diminishes lag. However, if desired, protective tubing such as fused silica capillaries may be employed. To more clearly bring out the desirability of utilizing cooling factors on the cold junction the thermo elements are shown as extending from the friction facing through the backing plate, although, of course, such an installation may not in fact be used. To provide for relative movement of the projecting end of the thermo elements these are fitted within the bushing 10 of any suitable material. This bushing may be secured at 11 with the brake shoe, so as to move therewith. The bushing operates in a slot 12 in the backing plate. The ends of the thermo elements are connected to the electrical leads 13 and 14, which may be connected directly (or through a potentiometer) to the indicator 15. This may comprise a suitably designed millivoltmeter of a suitable resistance so as to give the maximum deflection for the temperature ranges encountered in braking.

With suitably chosen differential metallic material for the thermo element a millivoltmeter of approximately 500 ohms resistance will give a full scaled deflection for 40 millivolts within an accuracy of approximately plus or minus 5° C.

It will be appreciated that a relatively wide range of differential metals or alloys may be utilized in the thermo couple. For example, an iron constantan may be utilized since this gives relatively accurate readings up to 800° C. However, since the friction facing may contain corrosive elements and since this corrosion may be accentuated during high temperatures more resistant couples are advisable. As an example of such a chromal-alumel couple may be used.

The indicator 15 is preferably positioned on the dash board and is calibrated in temperatures, such being indicated by the graduations 16. An indicia, as for example the arrow 17, may be emplaced upon the dial so as to illustrate the dangerous thermal condition of the brakes. As the pointer 18 moves upwardly to the arrow the operator is warned that the condition of his brakes is becoming dangerous and that they should be given an opportunity to cool. As will be appreciated such indication is particularly helpful in mountain driving.

For the purpose of illustration only one brake and one indicator has been shown. If desired only one such assemblage may be used. As the heat is generated the one brake will give a fair indication of the temperatures obtaining in the others. However, this is only a rough approximation. The preferable assemblage is one in which separate indication from all of the four wheels are given. This may be done by providing one indicator for each wheel or by providing one dial with which is associated four pointers, each pointer being connected respectively to one of the wheels of the vehicle.

It will be observed that such a provision is decidedly useful and advantageous and is an additional safety factor when installed on an automobile.

As indicated hereinbefore, the principles of the invention are susceptible of incorporation in a wide variety of specific mechanisms. All of these are comprehended within the broad concept of the invention as expressed in the subtended claim.

I claim:

A vehicle brake comprising a drum, a brake shoe having a friction lining thereon, a backing plate, a radial slot in the backing plate opposite said lining, a thermo couple passing through said slot and having its junction embedded in said lining and insulated from the shoe, means comprising a bushing carried by said shoe for protecting said thermal junction where it passes through said slot, connections to said thermocouple outside of said backing plate exposed to the passing air currents, and an electrical indicator connected with said thermo couple.

RAYMOND J. NORTON.